United States Patent [19]
Jacobson

[11] 4,025,728
[45] May 24, 1977

[54] SPEAKER TELEPHONE

[76] Inventor: Sava Jacobson, 8130 Orion, Van Nuys, Calif. 91406

[22] Filed: Jan. 29, 1976

[21] Appl. No.: 653,387

[52] U.S. Cl. .......................... 179/81 B; 179/1 HF; 179/1 A
[51] Int. Cl.² ........................................ H04M 1/60
[58] Field of Search ............ 179/81 B, 100 L, 1 H, 179/1 HF, 1 VC, 1 VL, 1 FS, 1 SW, 170.6, 170.8, 81 A, 1 A

[56] References Cited

UNITED STATES PATENTS

| | | | |
|---|---|---|---|
| 3,330,912 | 7/1967 | Koseki | 179/81 B |
| 3,562,791 | 2/1971 | Baker | 179/81 B |
| 3,660,603 | 5/1972 | Anderson | 179/1 VC |
| 3,823,273 | 7/1974 | Beeman | 179/81 B |
| 3,889,059 | 6/1975 | Thompson | 179/81 B |
| 3,909,548 | 9/1975 | Jacobson | 179/81 B |

*Primary Examiner*—Kathleen H. Claffy
*Assistant Examiner*—Joseph A. Popek
*Attorney, Agent, or Firm*—Howard A. Silber

[57] ABSTRACT

In this speaker telephone, the microphone and loudspeaker circuits both are connected directly to the telephone line, and both are normally disabled. Separate incoming and outgoing control circuits provide respective control signals that sequentially (1) disable the other control circuit and (2) enable the respective loudspeaker or microphone circuit. By use of the alternate, sequential disabling and enabling of the audio circuits and associated control circuits, sufficient isolation is obtained so that the loudspeaker and microphone can be mounted in the same housing.

17 Claims, 3 Drawing Figures

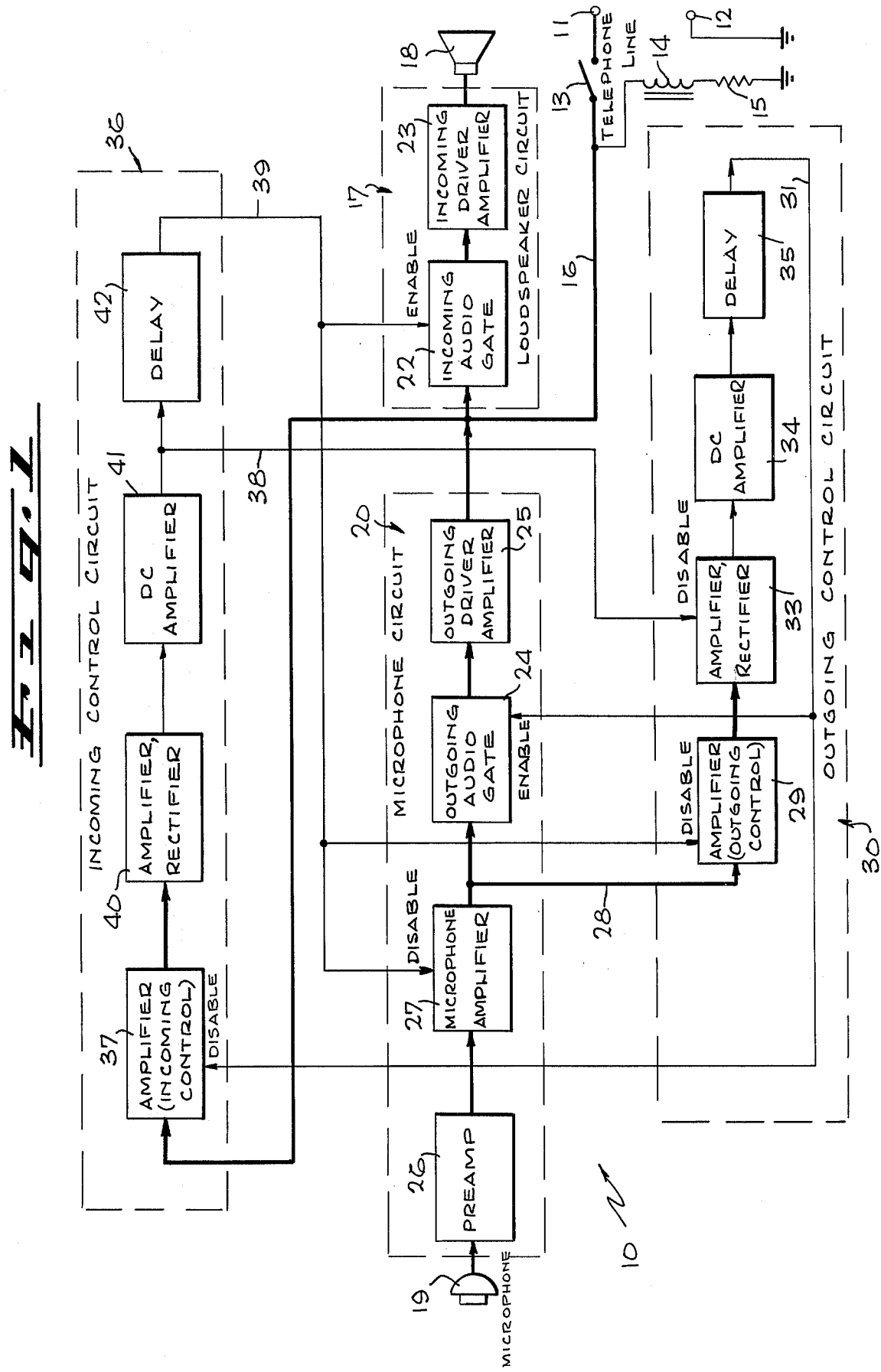

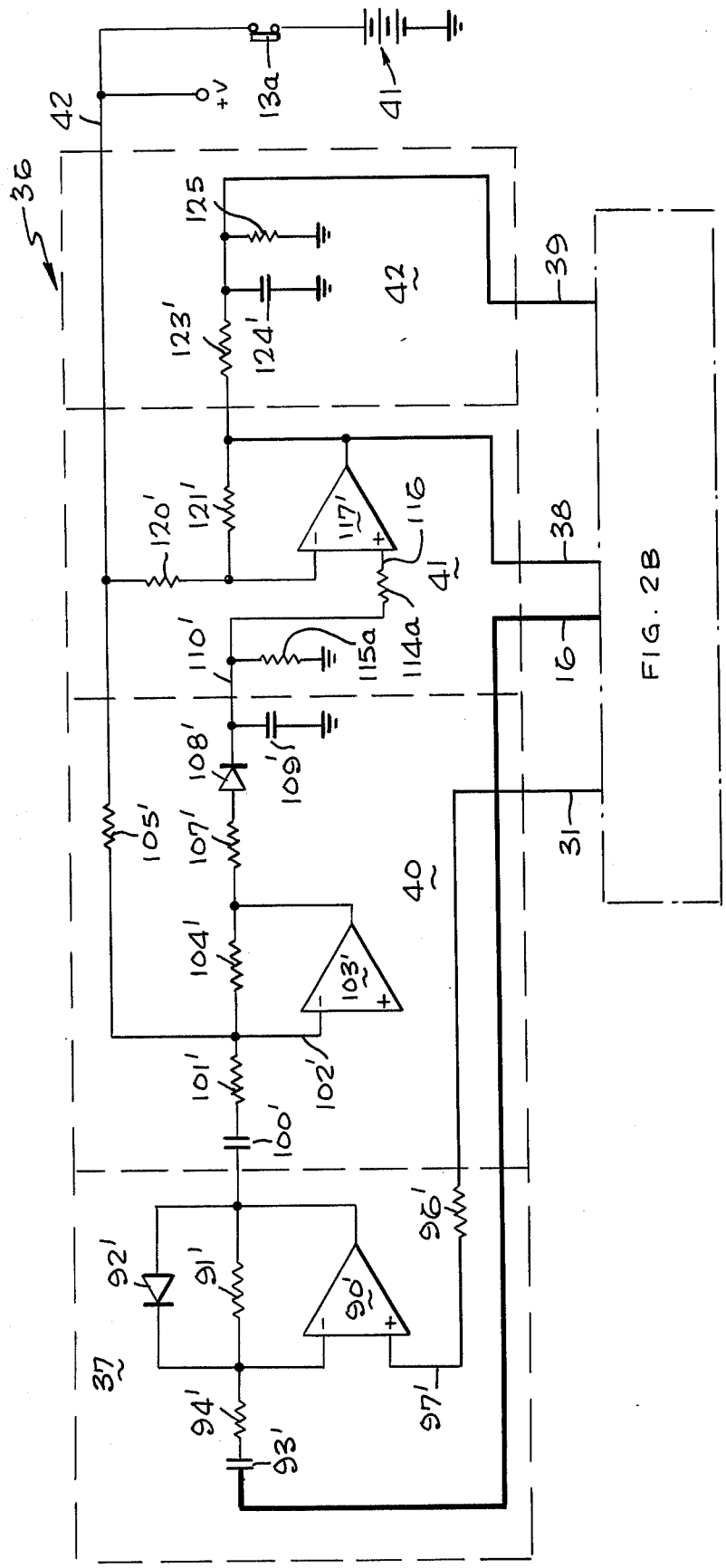

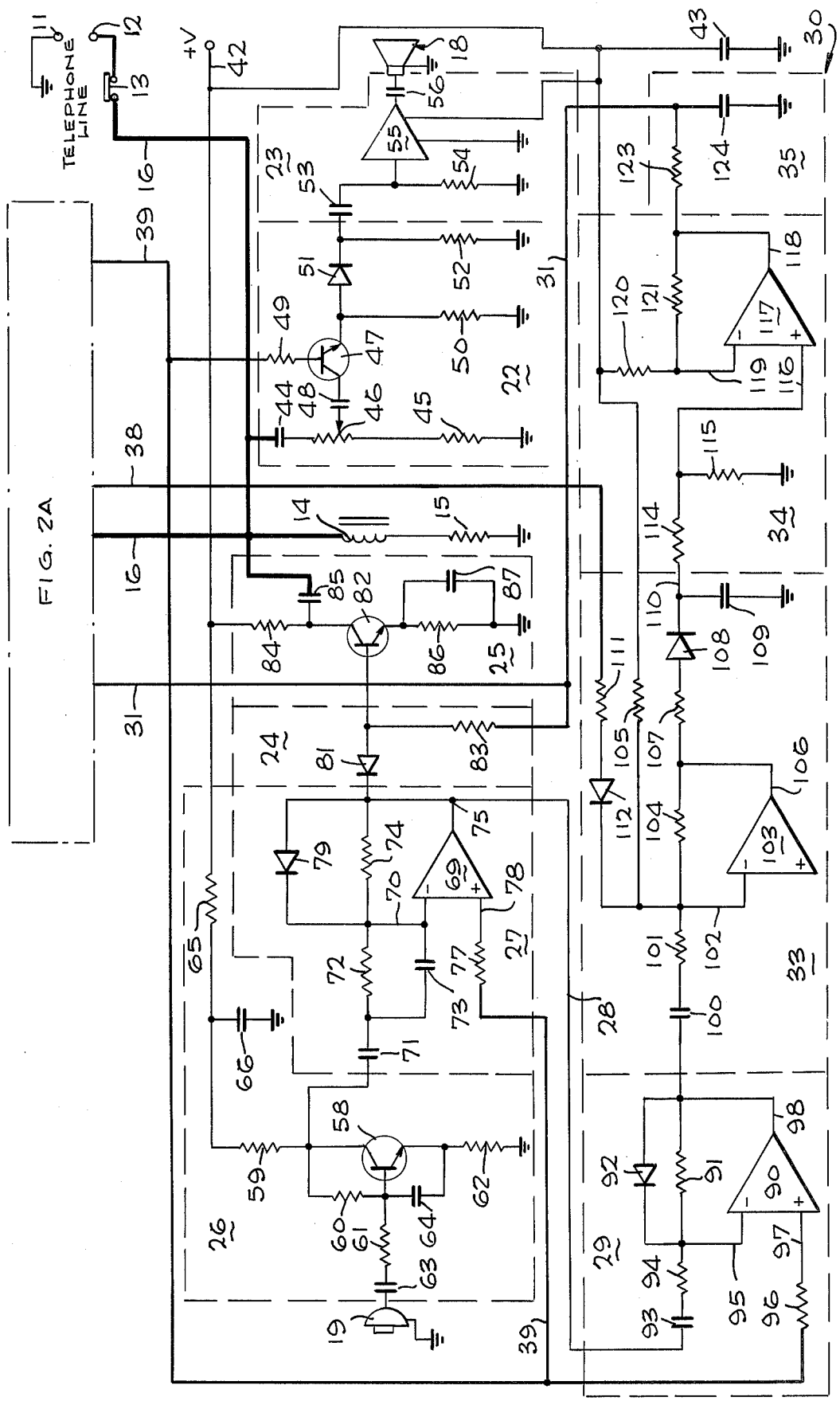

4,025,728

SPEAKER TELEPHONE

BACKGROUND OF THE INVENTION

1. Field of the Invention

The present invention relates to a speaker telephone, and particularly to such a device wherein the microphone and loudspeaker may be situated in a single housing.

2. Description of the Prior Art

Speaker telephones offer the convenience of "no hands" operation. The incoming signal is amplified and reproduced by a loudspeaker. The user's voice is picked up by a microphone and amplified for transmission to the line. Appropriate circuitry provides voice responsive operation, isolates the outgoing and incoming signals, and prevents audio feedback from the loudspeaker to the microphone.

Signal isolation and feedback prevention have been particularly difficult in the past. Electrical isolation between outgoing and incoming signals typically required use of a hybrid network. Elimination of acoustic feedback generally necessitated separate housings for the loudspeaker and the microphone. If these were placed in the same housing, loud speech from the speaker would cause the microphone output signal to be so large as to leak through the outgoing amplification circuitry and into the incoming signal path, causing feedback.

An object of the present invention is to provide a speaker telephone in which the microphone and loudspeaker may be situated in a single housing. Another object is to provide a speaker telephone in which no hybrid network or other isolation means is required between the loudspeaker and microphone circuits. A further object is to provide a speaker telephone in which the loudspeaker and microphone circuits are alternately, sequentially actuated and disabled to accomplish mode switching.

SUMMARY OF THE INVENTION

These and other objectives are achieved in a speaker telephone utilizing separate loudspeaker and microphone circuits that are both directly connected to the telephone line. Each of these circuits is provided with a respective audio gate that normally is disabled. Thus, in the quiescent state when no speech is present from either the telephone line or the microphone, both the loudspeaker and the microphone circuits are disabled.

The speaker telephone includes seperate incoming and outgoing control circuits that respectively enable the audio gates in the loudspeaker circuit and in the microphone circuit. When an audio signal is received from the telephone line and the user is not speaking into the microphone, the incoming control circuit will first disable the outgoing control circuit, and then enable the loudspeaker circuit so that the incoming signal will be reproduced by the loudspeaker. Since the outgoing control circuit is disabled, speech picked up by the microphone will not be transmitted. Conversely, if no audio is being received, speech picked up by the microphone will cause the outgoing control circuit to disable the incoming control circuit and to enable the audio gate in the microphone circuit. The speech will be transmitted to the telephone line, but the loudspeaker circuit will remain off so that neither the speech picked up by the microphone nor audio coming from the telephone line will be reproduced by the loudspeaker.

Since only one or the other of the microphone and loudspeaker circuits can be enabled at one time, the need for a hybrid network to isolate the incoming and outgoing signals is eliminated. Unwanted transmission or loudspeaker reproduction of sounds at the time of switchover is totally eliminated by the sequential disabling and actuation of the microphone and loudspeaker circuits. Thus, on the switchover from speech transmission to reception, the microphone circuit is disabled prior to enabling of the loudspeaker circuit. Conversely, on the switchover to speech transmission, the loudspeaker circuit is disabled prior to enabling of the microphone transmission circuits.

The microphone and speaker can be mounted in a single housing. The alternative, sequential cutoff and enabling of the transmission and reception circuits ensures that no acoustic feedback will occur, and that there will be no undesirable cross coupling between outgoing and incoming signals.

BRIEF DESCRIPTION OF THE DRAWINGS

A detailed description of the invention will be made with reference to the accompanying drawings wherein like numerals designate corresponding elements in the several figures.

FIG. 1 is an electrical block diagram of the inventive speaker telephone.

FIGS. 2A and 2B together comprise an electrical schematic diagram of the speaker telephone of FIG. 1.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

The inventive speaker telephone 10 (FIG. 1) is connected to a telephone line via the terminals 11 and 12. When the "on/off" switch 13 is closed, the telephone line is loaded by an inductor 14 and a current limiting resistor 15. Audio incoming from the telephone line is supplied via a line 16 to a loudspeaker amplification circuit 17 that drives a loudspeaker 18. Speech transmission is facilitated by a microphone 19 and its associated amplification circuitry 20 which is connected to the telephone line via the line 16. Advantageously, the loudspeaker 18 and the microphone 19 may be housed in the same cabinet (not shown).

In the quiescent state when speech is neither received nor transmitted, both the loudspeaker circuit 17 and the output stages of the microphone circuit 20 are disabled. In the loudspeaker circuit 17, the telephone line is connected to an incoming audio gate 22 which normally is disabled. Thus the gate 22 normally appears as an open circuit between the audio line 16 and an amplifier 23 which drives the loudspeaker 18. Similarly, during the quiescent state, an outgoing audio gate 24 is disabled so as to present an open circuit preventing speech from the microphone 19 from reaching an amplifier 25 that is used to drive the telephone line during speech transmission.

In the absence of incoming audio, when the user speaks into the microphone 20 the resultant signal is amplified by a preamplifier 26 and another amplifier stage 27 that normally is enabled. The audio output from the amplifier 27 is supplied via a line 28 to the first amplifier stage 29 of an outgoing control circuit 30. Since no audio is being received from the telephone line, the outgoing control circuit 30 is able to produce on a line 31 an outgoing control signal in response to an audio output from the microphone 19. This outgoing control signal enables the audio gate 24 so that speech from the microphone 19 now is transmitted via the amplifier 27, the enabled gate 24 and the driver amplifier 25 to the telephone line. Although this outgoing speech is transmitted via the line 16, and hence reaches the input of the loudspeaker circuit 17, it is not reproduced by the loudspeaker 18 since the incoming audio gate 22 remains disabled.

In the outgoing control circuit 30, the audio output of the amplifier 29 is additionally amplified and then rectified by a circuit 33. The resultant dc signal is processed by a dc amplifier 34 and a short time constant delay 35, the output of which comprises the outgoing control signal on the line 31. This dc signal remains present so long as speech is transmitted from the microphone 19.

Once speech transmission has begun, audio received from the telephone line will not turn on the loudspeaker circuit 17. Such turn-on is prevented by the outgoing control signal on the line 31 which disables an incoming control circuit 36. In that circuit, the audio line 16 is supplied to an amplifier 37. If enabled, the incoming control circuit 36 produces first and second incoming control signals on the respective lines 38 and 39 in response to occurrence of an audio signal on the line 16. However, the amplifier 37 is disabled by the outgoing control signal on the line 31, so that no incoming control signals are produced during speech transmission.

When speech transmission has terminated, or during a pause in such speech, the occurrence of an incoming audio signal from the telephone line will cause the speaker telephone 10 to switch over to the receive mode in which the incoming signal is reproduced by the loudspeaker 18 and in which speech transmission is inhibited.

In the absence of speech transmission, no outgoing control signal is present on the line 31. As a result, the amplifier 37 is not disabled, and hence functions to amplify the audio received from the telephone line. The resultant audio signal is further amplified and then rectified in a circuit 40. The dc output of the circuit 40 is amplified by a dc amplifier 41 the output of which comprises the first incoming control signal on the line 38. This signal is delayed very briefly by a delay circuit 42 to provide the second incoming control on the line 39.

The first incoming control signal on the line 38 is used to disable the circuitry 33 in the outgoing control circuit 30. Since the signal on the line 38 is produced almost immediately in response to occurrence of an audio input from the telephone line, disabling of the circuitry 33 insures that no outgoing control signal will be produced on the line 31, and hence that the incoming control circuit 36 will not be disabled so long as incoming audio continues to be received from the telephone line. Moreover, it ensures that the outgoing audio gate 24 will remain disabled during such audio reception.

Because of the delay circuit 42, the second incoming control signal is produced on the line 39 a short time after occurrence of the first control signal on the line 38. The signal on the line 39 enables the incoming audio gate 22 so that audio signals received from the telephone line now are supplied via the line 16 and the enabled gate 22 to the driver amplifier 23 and the loudspeaker 18. The user hears the incoming speech. Since the outgoing audio gate 24 was disabled prior to turn on of the incoming audio gate 22, the sound which is produced by the loudspeaker 18, though picked up by the microphone 19, will not get through the disabled gate 24. No undesirable feedback oscillation will result. Further to ensure that no audio from the microphone 19 reaches either the driver amplifier 25 or the circuitry 33 in the outgoing control circuit, the second incoming control signal on the line 39 also is used to disable both the amplifiers 27 and 29. In this manner, reproduction of the incoming audio now preempts speech transmission.

Speech transmission cannot occur again until an interruption or termination of the incoming audio. Once such termination occurs, the incoming control signals on the lines 38 and 39 likewise terminate. This disables the incoming audio gate, thereby open-circuiting the loudspeaker circuit 17, and enables the microphone amplifiers 27 and 29 so that speech transmission once again is possible. If such speech is detected by the microphone 19, the control circuit 30 will produce the outgoing control signal on the line 31 which enables the outgoing audio gate 24 subsequent to disabling of the incoming audio gate 22. Note that although the incoming control circuit 36 also is disabled by the signal on the line 31, production by the circuit 36 of the incoming control signals on the lines 38 and 39 has previously ceased.

Thus, during switchover from receive to transmit, the loudspeaker circuit 17 and the incoming control circuit 36 effectively are disabled before the microphone circuit 20 is enabled. Conversely, during switchover from speech transmission to audio reception, the microphone circuit 20 and the outgoing control circuit 30 are disabled before the loudspeaker circuit 17 is enabled.

Circuitry details of the inventive speaker telephone 10 are shown in FIGS. 2A and 2B. Referring thereto, the on-off switch 13 has an additional section 13a that connects power from a battery 41 to a positive voltage line 42. The voltage is filtered by a capacitor 43. When the switch 13 is closed, the telephone line is connected to the audio line as discussed above, and power from the battery 41 is connected to all of the speaker telephone 10 circuitry.

Audio incoming from the telephone line is provided to the audio gate 22 via the line 16, a capacitor 44, a resistor 45 and a potentiometer 46 which serves to control the volume of the audio reproduced by the loudspeaker 18. Audio gating is performed by a transistor 47 that is series connected with a capacitor 48 in the audio path. The second incoming control signal on the line 39 is supplied to the base of the transistor 47 via a resistor 49. When this signal is low, the transistor 47 is non-conducting or open-circuited, so that there is no audio flow from the volume control 46 to the driver amplifier 23. When the dc control signal on the line 39 goes high, the transistor 47 conducts, and an output audio signal is developed across an emitter resistor 50. A diode 51, connected in the audio output path, blocks any negative-going signals that might leak through the transistor 47 in the event of very high level audio output from the outgoing driver amplifier 25. When the transistor 47 is on, the resultant audio from the diode 51 is developed across a resistor 52 and supplied via a capacitor 53 and a resistor 52 to the input of a conventional integrated circuit audio amplifier 55 such as that sold commercially as type NS386N. The audio output signal is supplied via a capacitor 56 to the loudspeaker 18.

The microphone preamplifier 26 is a conventional low-noise amplifier employing a transistor 58 and its associated resistors 59–62 and an input capacitor 63. A capacitor 64 functions as an rf bypass and a resistor 65 and capacitor 66 provide dc isolation.

The microphone amplifier 27 utilizes an integrated circuit operational amplifier 69 wherein the audio signal is supplied to the inverting (negative) input 70 via a coupling capacitor 71 and a resistor 72 shunted by a capacitor 73. Negative feedback is provided by a resistor 74 connected between the amplifier output terminal 75 and the negative input terminal 70.

To disable the amplifier 69, the second incoming control signal on the line 39 is supplied via a resistor 77 to the non-inverting (positive) amplifier input 78. A diode 79 is connected for forward conduction between the amplifier output terminal 75 and the inverting input 70.

In the absence of a control signal on the line 39, the drop across the resistor 74 (typically 0.03 volts) is insufficient to cause conduction of the diode 79. The amplifier 69 provides normal amplification with a gain determined by the ratio of the feedback resistor 74 to the input resistor 72.

Upon occurrence of a control signal on the line 39, current is injected into the positive input terminal 78, so that the amplifier output terminal 75 begins to rise in voltage. However, only a slight rise (typically to about 0.8 volts) is sufficient to forward bias the diode 79. As a result, enough current flows through the diode 79 to cause its impedance to drop significantly, to a value that is much lower than the feedback resistor 74. As a result, since the gain is determined by the ratio of the feedback resistance to the input resistor 72, this substantial drop in impedance the diode 79 very rapidly causes the gain of the amplifier 69 to drop to a low level. Very fast turnoff is achieved.

The outgoing audio gate 24 comprises a diode 81 connected in reverse polarity between the output terminal 75 of the amplifier 69 and the base of a transistor 82 in the outgoing driver amplifier 25. A resistor 83 is connected from the base of the transistor 82 to the line 31 from the outgoing control circuit 30.

When the outgoing control signal is not present, the line 31 is essentially at ground potential. As a result, the diode 81 is reversed biased, so that no audio signal flows through the diode 81 from the amplifier 27 to the amplifier 25. When the outgoing control signal is present, the line 31 is at a sufficiently positive potential so as to forward bias the diode 81. The small dc current which flows through the diode 81 does not disturb the potential at the terminal 75, since the operational amplifier 69 gain is held firm by the feedback resistor 74. However, the dc current through the diode 81 causes its impedance to drop to a low value, so that an audio path now is provided through the diode 81 from the amplifier 27 to the transistor 82. The gating function is achieved.

Occurrence of the outgoing control signal also provides base bias to turn on the transistor 82. Therefore, the transistor 82 also operates as a gate in addition to functioning as the outgoing driver amplifier. The collector of the transistor 82 is connected to the positive voltage line 42 via resistor 84 and to the audio output line 16 via a coupling capacitor 85. The emitter of the transistor 82 is connected to ground via a resistor 86 shunted by a capacitor 87.

The bias voltage at the base of the transistor 82 is set by the fixed potential at the operational amplifier output terminal 75 and the voltage drop across the diode 81. Since the base-emitter voltage of the transistor 82 also is a fixed value, the emitter voltage of the transistor 82 in the presence of a control signal on the line 31 is fixed. The value of the resistor 86 accordingly is selected so as to provide the appropriate collector current through the resistor 84 for the fixed emitter voltage.

In the outgoing control circuit 30, the amplifier 29 is substantially configured like the microphone amplifier 27. Thus it employs an operational amplifier 90 having a negative feedback resistor 91 shunted by a reverse diode 92. Audio from the microphone amplifier 27 is supplied via the line 28, a capacitor 93 and a resistor 94 to the amplifier negative input terminal 95. The audio gain is established by the ratio of the feedback resistor 91 to the input resistor 94.

The second incoming control signal on the line 39 is connected via a resistor 96 to the positive input terminal 97 of the amplifier 90. Occurrence of this control signal causes the amplifier output terminal 98 to go positive, which rapidly forward biases the diode 92. The resultant very low impedance of the diode 92 immediately drops the gain of the amplifier 90, resulting in very fast disabling of the amplifier circuit 29.

In the circuitry 33, the audio signal from the amplifier 29 is supplied via a capacitor 100 and a resistor 101 to the negative input terminal 102 of an operational amplifier 103 having a feedback resistor 104. Sufficient current is injected into the negative input terminal 102 via a resistor 105 so as to maintain the amplifier output terminal 106 at about ground potential under quiescent conditions.

In the absence of an incoming control signal on line 38, an audio signal supplied via the capacitor 100 will be amplified by the amplifier 103 and supplied via a resistor 107 to a rectifier diode 108. The resultant rectified signal will charge a capacitor 109, the voltage across which is supplied via a line 110 to the dc amplifier 34.

The circuit 33 is disabled by the incoming control signal on the line 38. This signal causes additional current to be injected into the amplifier negative input terminal 102 via a resistor 111 and a diode 112. As a result, the "floating" amplifier output terminal 106 is driven negative with respect to ground. As a result, any audio signal appearing at the capacitor 100 is insufficient to drive the amplifier 103 output up to a level that will charge the capacitor 109. In this manner, the circuit 33 is disabled.

In the dc amplifier circuit 34, a voltage divider consisting of resistors 114 and 115 provide to the positive input terminal 116 of an operational amplifier 117 a voltage that is proportional to that produced across the capacitor 109. This dc voltage is amplified by the amplifier 117 to provide an output at a terminal 118. Injection current to the negative input terminal 119 is provided by a resistor 120 and negative feedback is provided by a resistor 121.

The delay circuit 35 comprises a resistor 123 and a capacitor 124. The values of these components are selected to provide a very brief delay, typically on the order of 1.35 msec.

The incoming control circuit 36 is configured substantially the same as the outgoing control circuit 30, and hence need not be separately described. Corresponding components have been assigned primed numbers identical to the like numbered, but unprimed components in the control circuit 30. Of course, in the control circuit 36, the amplifier 37 is disabled by the outgoing control signal on the line 31. Hence that line is connected via the resistor 96' to the positive input terminal 97' of the amplifier 90. Furthermore, the circuitry 40 is not disabled, so there is no disabling input to the operational amplifier 103'. No voltage divider is used in the input to the operational amplifier 117'. However, the voltage on the line 110' is developed across a resistor 115a and supplied to the input terminal 116' via a resistor 114a.

In the delay circuit 42, a resistor 125 shunts the capacitor 124'. Advantageously, the values of the capacitor 124' and the resistor 123' are selected so as to provide a delay RC time constant on the order of ten times that of the delay circuit 35. Typically, this delay may be on the order of 13.5 msec.

Intending to claim all novel, useful and unobvious features shown or described, the inventor makes the following claims:

1. A speaker telephone having terminals for connection to a telephone line comprising:
    a microphone connected via an outgoing audio gate circuit and an outgoing amplifier to the telephone line terminals,
    a loudspeaker, said telephone line terminals being connected via an incoming audio gate and an incoming amplifier to said loudspeaker,
    an incoming control circuit, connected to receive audio incoming from said telephone line, for producing a first incoming control signal in response to said incoming audio, and for producing a second incoming control signal slightly delayed with respect to said first incoming control signal, and connected so that said second incoming control signal enables said incoming audio gate, and
    an outgoing control circuit, responsive to audio from said microphone but disabled by said first incoming control signal, for producing an outgoing control signal in response to occurrence of audio from said microphone, and connected so that said outgoing control signal enables said outgoing audio gate and disables said incoming control circuit,
    each of said incoming and outgoing control circuits producing its respective control signals only when not disabled by the disabling control signal from the other of said control circuits.

2. A speaker telephone according to claim 1 wherein said microphone is connected via a first microphone amplifier to said outgoing audio gate, and wherein said second incoming control signal also disables said first microphone amplifier.

3. A speaker telephone according to claim 2 wherein said outgoing control circuit comprises:
    a second microphone amplifier connected to receive the audio output from said first microphone amplifier, and
    outgoing dc signal means for rectifying the audio supplied from said second microphone amplifier to produce said outgoing control signal, said second microphone amplifier also being disabled by said second incoming control signal, said dc signal means being disabled by said first incoming control signal.

4. A speaker telephone according to claim 3 wherein said first and second microphone amplifier each comprises:
    an operational amplifier having inverting (negative) and non-inverting (positive) inputs, the audio input to each such amplifier being supplied to the inverting input thereof,
    a feedback resistor connected between the output terminal and the inverting input of said operational amplifier,
    a diode connected for forward conduction from the output terminal to said inverting input of said operational amplifier, and wherein
    said second incoming control signal is supplied to the non-inverting operational amplifier inputs of both said first and second microphone amplifiers, so that upon occurrence of said second incoming control signal the resultant increased output of each operational amplifier will cause the respective diode to exhibit a low impedance, and thereby rapidly cut off the operational amplifier by substantially reducing the gain thereof.

5. A speaker telephone according to claim 3 wherein said outgoing dc signal means comprises:
    a rectifier,
    an operational amplifier connected to provide the audio output from said second microphone amplifier to said rectifier for rectification thereby,
    a dc amplifier for amplifying the dc rectifier output, and
    a delay circuit for delaying said dc amplifier output to produce said outgoing control signals.

6. A speaker telephone according to claim 5 wherein the audio output from said second microphone amplifier is connected to the inverting (negative) input of said operational amplifier, and wherein said first incoming control signal is connected via a diode to said same inverting input, occurrence of said first incoming control signal forcing the output of said operational amplifier to a minimum.

7. A speaker telephone according to claim 5 wherein said delay circuit comprises a capacitor charged via a resistor from the output of said dc amplifier.

8. A speaker telephone according to claim 1 wherein said incoming control circuit comprises:
    an incoming audio amplifier having its input connected to said telephone line terminals to amplify audio received therefrom, said incoming audio amplifier being disabled by said outgoing control signal, and
    incoming dc signal means for rectifying the audio from said incoming audio amplifier to produce said first incoming control signal.

9. A speaker telephone according to claim 8 wherein said incoming dc signal means comprises:
    a rectifier,
    a first operational amplifier connected between the output of said incoming audio amplifier and said rectifier, and
    a second operational amplifier connected to amplify the dc output from said rectifier, said first incoming control signal being obtained from the output of said second operational amplifier.

10. A speaker telephone in accordance with claim 1 wherein said outgoing control circuit includes delay means for producing said outgoing control signal in slightly delayed relationship to occurrence of said audio from said microphone, and wherein the delay time of said delay means is shorter than the delay time between occurrence of said first and second incoming control signals.

11. A speaker telephone having a set of terminals for connection to a telephone line, comprising:
- a microphone and a normally disabled microphone circuit, connected directly to said terminals, for amplifying audio from said microphone for transmission directly to said telephone line,
- a loudspeaker and a normally disabled loudspeaker circuit, connected directly to said terminals, for amplifying audio received from said telephone line for reproduction by said loudspeaker,
- control circuit means, connected to said microphone circuit and to said loudspeaker circuit, responsive to audio from said microphone except when said loudspeaker circuit is enabled and responsive to audio from said telephone line except when said microphone circuit is enabled, for sequentially, alternately disabling one and enabling the other of said microphone and loudspeaker circuits to accomplish mode switching between transmit and receive respectively in response to receipt of audio from said microphone or telephone line.

12. A speaker telephone according to claim 11 wherein said control circuit means comprises an outgoing control circuit and an incoming control circuit,
- said outgoing control circuit being connected to said microphone to produce an outgoing control signal in response to audio received therefrom, said outgoing control signal being connected to enable said microphone circuit and to disable said incoming control circuit,
- said incoming control circuit being connected to said terminals to produce incoming control signals in response to receipt of audio from said telephone line, said incoming control signals being connected to enable said loudspeaker circuit and to disable said outgoing control circuit.

13. A speaker telephone according to claim 12 wherein the incoming control signal that enables said loudspeaker circuit is delayed with respect to the incoming control signal that disables said outgoing control circuit.

14. A speaker telephone according to claim 13 wherein audio from said microphone is supplied to a first amplifier in said microphone circuit and to a second amplifier in said outgoing control circuit, and wherein the incoming control signal that enables said loudspeaker circuit also disables said first and second amplifiers.

15. A speaker telephone according to claim 14 wherein said outgoing control circuit includes rectifier means for rectifying the audio output from said second amplifier to produce a dc outgoing control signal, and wherein the incoming control signal that disables said outgoing control circuit is connected to prevent said rectifier means from producing said dc signal.

16. A speaker telephone according to claim 15 wherein said rectifier circuit comprises:
- an operational amplifier having a floating output, audio from said second amplifier being supplied to an input of said operational amplifier,
- a capacitor,
- a rectifier diode connected between said floating operational amplifier output and said capacitor so that said capacitor is charged by the rectified output of said operational amplifier, and wherein
- said incoming control signal that disables said outgoing control circuit is connected to an input of said operational amplifier so as to drive the output thereof to a level sufficiently below system ground so as to prevent said capacitor from being charged.

17. In a speaker telephone, an audio amplifier that can be disabled by a dc control signal, comprising:
- an operational amplifier having inverting and non-inverting input terminals, input audio being supplied to said inverting input terminal via a first resistor,
- a feedback resistor connected between the output terminal of said operational amplifier and said inverting input terminal, the audio gain of said amplifier being determined by the ratio of said feedback resistor to said first resistor,
- a diode connected across said feedback resistor, said diode being poled to be reverse biased during audio amplification by said operational amplifier,
- said dc control signal being fed to said non-inverting input, so that occurrence of said control signal causes the dc level at the output of said operational amplifier to rise sufficiently to forward bias said diode, the resultant low impedance of said diode shunting said feedback resistor so as to drop the gain of said operational amplifier.

* * * * *